US010922607B2

(12) United States Patent
Sengupta et al.

(10) Patent No.: US 10,922,607 B2
(45) Date of Patent: Feb. 16, 2021

(54) EVENT DRIVEN AND TIME HOPPING NEURAL NETWORK

(71) Applicant: Intel Corporation, Santa Clara, CA (US)

(72) Inventors: Abhronil Sengupta, West Lafayette, IN (US); Gregory K. Chen, Portland, OR (US); Raghavan Kumar, Hillsboro, OR (US); Huseyin Ekin Sumbul, Portland, OR (US); Phil Knag, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1037 days.

(21) Appl. No.: 15/394,976

(22) Filed: Dec. 30, 2016

(65) Prior Publication Data

US 2018/0189648 A1 Jul. 5, 2018

(51) Int. Cl.
*G06N 3/08* (2006.01)
*G06N 3/04* (2006.01)

(52) U.S. Cl.
CPC .............. *G06N 3/08* (2013.01); *G06N 3/049* (2013.01)

(58) Field of Classification Search
CPC ................................ G06N 3/08; G06N 3/049
See application file for complete search history.

(56) References Cited

U.S. PATENT DOCUMENTS

| 9,147,156 | B2 * | 9/2015 | Izhikevich | ............. G06N 3/049 |
| 2013/0325765 | A1 | 12/2013 | Hunzinger | |
| 2016/0098629 | A1 * | 4/2016 | Lipasti | ..................... G06N 3/04 |
| | | | | 706/26 |
| 2016/0321537 | A1 * | 11/2016 | Akopyan | ................ G06N 3/063 |
| 2017/0116513 | A1 * | 4/2017 | Andreopoulos | ..... G06N 3/0445 |
| 2018/0189631 | A1 | 7/2018 | Sumbul et al. | |
| 2018/0189645 | A1 | 7/2018 | Chen et al. | |

FOREIGN PATENT DOCUMENTS

WO WO-2016187706 A1 * 12/2016 ............. G06N 3/049

OTHER PUBLICATIONS

Rochel, Olivier."An Event-Driven Framework for the Simulation of Networks of Spiking Neurons." European Symposium on Artificial Neural Networks Bruges (Belgium), Apr. 23-25, 2003, pp. 295-300. (Year: 2003).*
Extended European Search Report for European Application No. 17205510.5 dated May 23, 2018, 12 pages.
(Continued)

*Primary Examiner* — Austin Hicks
(74) *Attorney, Agent, or Firm* — Alliance IP, LLC

(57) ABSTRACT

In one embodiment, a processor is to store a membrane potential of a neural unit of a neural network; and calculate, at a particular time-step of the neural network, a change to the membrane potential of the neural unit occurring over multiple time-steps that have elapsed since the last time-step at which the membrane potential was updated, wherein each of the multiple time-steps that have elapsed since the last time-step is associated with at least one input to the neural unit that affects the membrane potential of the neural unit.

20 Claims, 9 Drawing Sheets

(56) References Cited

OTHER PUBLICATIONS

Painkras, Eustace, et al., "SpiNNaker: A 1-W 18-Core System-on-Chip for Massively-Parallel Neural Network Simulation", IEEE Journal of Solid-State Circuits, vol. 48, No. 8, Aug. 1, 2013, pp. 1943-1953.
Rostro-Gonzalez, Horacio, et al., "Low-cost hardware implementations for discrete-time spiking neural networks", accessed at: https://hal.archives-ouvertes.fr/hal-00553431 on May 9, 2018, last updated Mar. 16, 2011, 8 pages.
EPO; Office Action issued in EP Patent Application No. 17205510.5; dated Jul. 30, 2019; 7 pages.
U.S. Appl. No. 14/757,397, filed Dec. 23, 2015, Chen et al.
U.S. Appl. No. 15/088,543, filed Apr. 4, 2016, Chen et al.
U.S. Appl. No. 15/392,407, filed Dec. 28, 2016, Chen et al.
U.S. Appl. No. 15/394,897 entitled "Neuromorphic Computer with Reconfigurable Memory for Various Neural Network Topologies", filed Dec. 30, 2016, 58 pages.
U.S. Appl. No. 15/395,231 entitled "Neural Network with Reconfigurable Sparse Connectivity and Online Learning", filed Dec. 30, 2016, 58 pages.

\* cited by examiner

EVENT DRIVEN AND TIME HOPPING NEURAL NETWORK

FIELD

The present disclosure relates in general to the field of computer development, and more specifically, to an event driven and time hopping neural network.

BACKGROUND

A neural network may include a group of neural units loosely modeled after the structure of a biological brain which includes large clusters of neurons connected by synapses. In a neural network, neural units are connected to other neural units via links which may be excitatory or inhibitory in their effect on the activation state of connected neural units. A neural unit may perform a function utilizing the values of its inputs to update a membrane potential of the neural unit. A neural unit may propagate a spike signal to connected neural units when a threshold associated with the neural unit is surpassed. A neural network may be trained or otherwise adapted to perform various data processing tasks, such as computer vision tasks, speech recognition tasks, or other suitable computing tasks.

BRIEF DESCRIPTION OF THE DRAWINGS

Like reference numbers and designations in the various drawings indicate like elements.

DETAILED DESCRIPTION

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to specific integrated circuits, such as computing platforms or microprocessors, other embodiments are applicable to other types of integrated circuits and logic devices. Similar techniques and teachings of embodiments described herein may be applied to other types of circuits or semiconductor devices. For example, the disclosed embodiments may be used in various devices, such as server computer systems, desktop computer systems, handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatuses, methods, and systems described herein are not limited to physical computing devices, but may also relate to software optimizations for energy conservation and efficiency.

Figure 1:
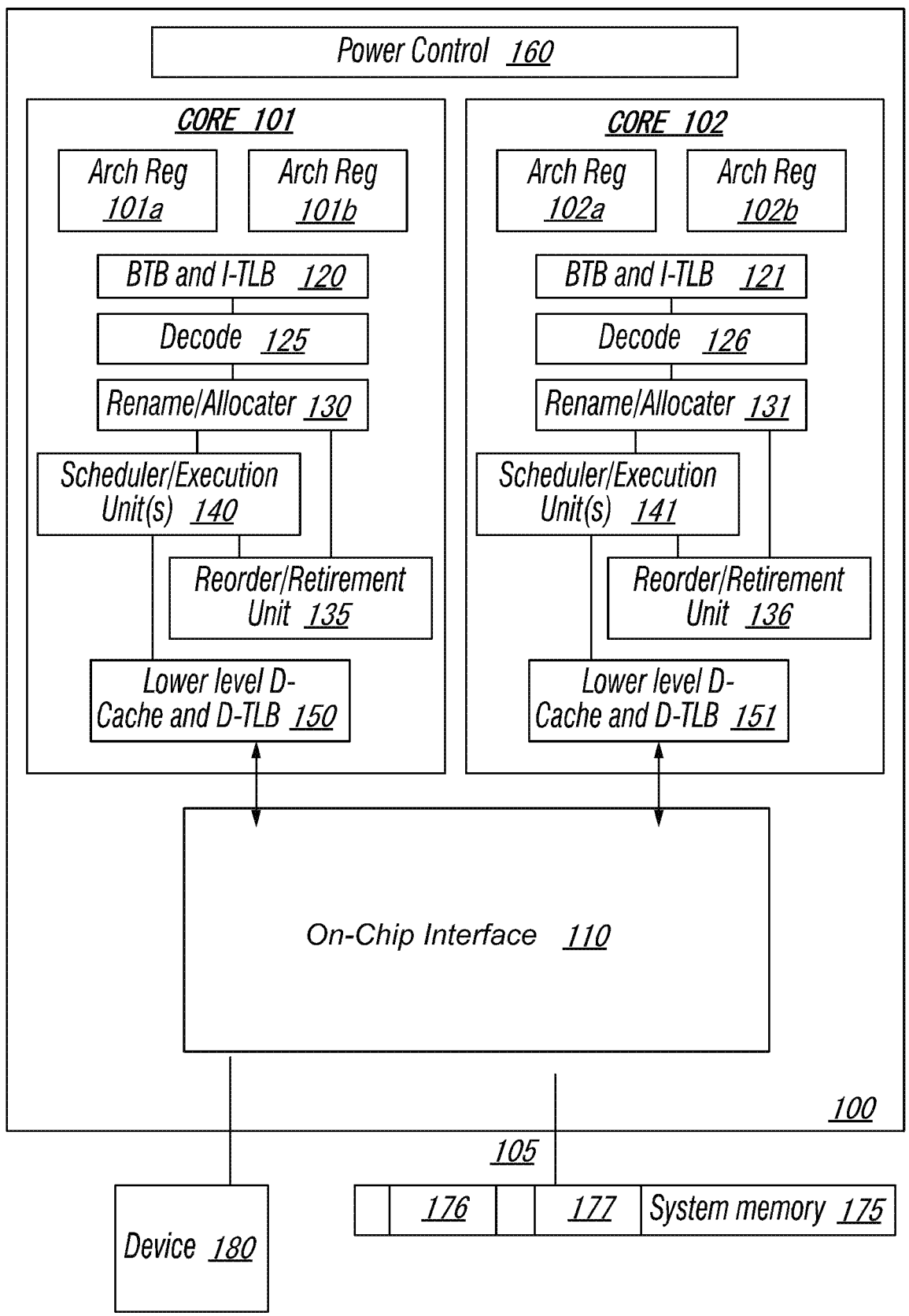
FIG. 1 illustrates a block diagram for an example computing system including a multicore processor that may implement a neural network in accordance with certain embodiments.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores-core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores-core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, I-TLB 120, load/store buffers, and queues may be shared through partitioning. Other resources, such as general purpose internal registers, page-table base register(s), low-level data-cache and data-TLB 150 execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/ resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files (RFs) to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache-a type of instruction cache-instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 110 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 2:
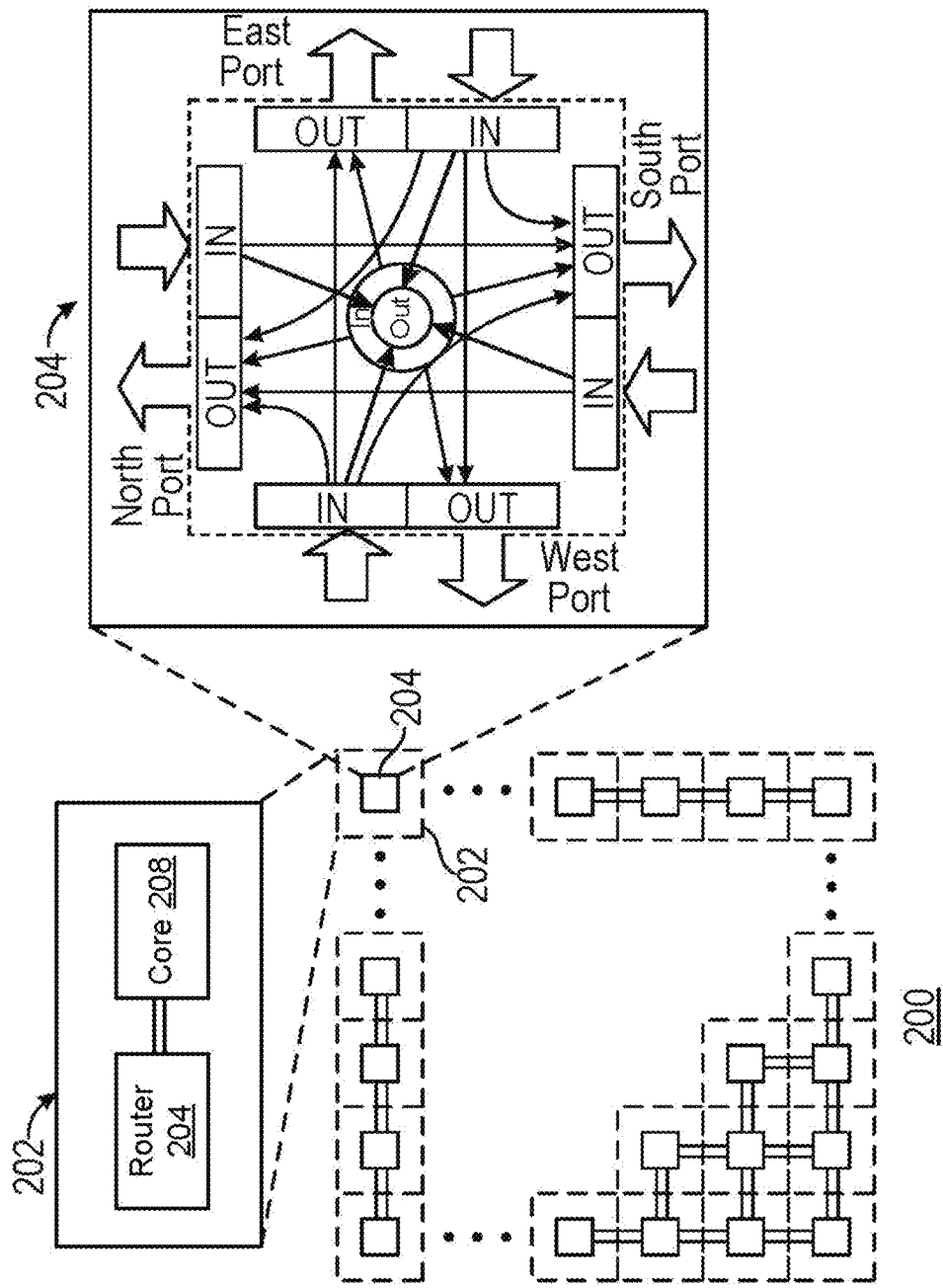
FIG. 2 illustrates a block diagram of a processor comprising a network on a chip (NoC) system that may implement a neural network in accordance with certain embodiments.

FIG. 2 illustrates a block diagram of a processor 200 comprising a network on a chip (NoC) system that may implement a neural network in accordance with certain embodiments. The processor 200 may include any processor or processing device, such as a microprocessor, an embedded processor, a digital signal processor (DSP), a network processor, a handheld processor, an application processor, a co-processor, an SoC, or other device to execute code. In particular embodiments, processor 200 is implemented on a single die. Processor 200 may include any of the components of processor 100 and/or have any of the characteristics of processor 100.

In the embodiment depicted, processor 200 includes a plurality of network elements 202 arranged in a grid network and coupled to each other with bi-directional links. However, an NoC in accordance with various embodiments of the present disclosure may be applied to any suitable network topologies (e.g., a hierarchical network or a ring network), sizes, bus widths, and processes. In the embodiment depicted, each network element 202 includes a router 204 and a core 208 (which in some embodiments may be a neuromorphic core), however in other embodiments, multiple cores from different network elements 202 may share a single router 204. The routers 204 may be communicatively linked with one another in a network, such as a packet-switched network and/or a circuit-switched network, thus enabling communication between components (such as cores, storage elements, or other logic blocks) of the NoC that are connected to the routers. In the embodiment depicted, each router 204 is communicatively coupled to its own core 208. In various embodiments, each router 204 may be communicatively coupled to multiple cores 208 (or other processing elements or logic blocks). As used herein, a reference to a core may also apply to other embodiments where a different logic block is used in place of a core. For example, various logic blocks may comprise a hardware accelerator (e.g., a graphics accelerator, multimedia accelerator, or video encode/decode accelerator), I/O block, memory controller, or other suitable fixed function logic. The processor 200 may include any number of processing elements or other logic blocks that may be symmetric or asymmetric. For example, the cores 208 of processor 200 may include asymmetric cores or symmetric cores. Processor 200 may include logic to operate as either or both of a packet-switched network and a circuit-switched network to provide intra-die communication.

In particular embodiments, packets may be communicated among the various routers 204 using resources of a packet-switched network. That is, the packet-switched network may provide communication between the routers (and their associated cores). The packets may include a control portion and a data portion. The control portion may include a destination address of the packet, and the data portion may contain the specific data to be communicated on the die 100. For example, the control portion may include a destination address that corresponds to one of the network elements or cores of the die. In some embodiments, the packet-switched network includes buffering logic because a dedicated path is not assured from a source to a destination and so a packet may need to be stopped temporarily if two or more packets need to traverse the same link or interconnect. As an example, the packets may be buffered (e.g., by flip flops) at each of the respective routers as the packet travels from a source to a destination. In other embodiments, the buffering logic may be omitted and packets may be dropped when collision occurs. The packets may be received, transmitted and processed by the routers 204. The packet-switched network may use point-to-point communication between neighboring routers. The control portions of the packets may be transferred between routers based on a packet clock, such as a 4 GHz clock. The data portion of the packets may be transferred between routers based on a similar clock, such as a 4 GHz clock.

In an embodiment, routers of processor 200 may be variously provided in two networks or communicate in two networks, such as a packet-switched network and a circuit-switched network. Such a communication approach may be termed a hybrid packet/circuit-switched network. In such embodiments, packets may be variously communicated among the various routers 204 using resources of the packet-switched network and the circuit-switched network. In order to transmit a single data packet, the circuit-switched network may allocate an entire path, whereas the packet-switched network may allocate only a single segment (or interconnect). In some embodiments, the packet-switched network may be utilized to reserve resources of the circuit-switched network for transmission of data between routers 204.

Router 204 may include a plurality of port sets to variously couple to and communicate with adjoining network elements 202. For example, circuit-switched and/or packet-switched signals may be communicated through these port sets. Port sets of router 204 may be logically divided, for example, according to the direction of adjoining network elements and/or the direction of traffic exchanges with such elements. For example, router 204 may include a north port set with input ("IN") and output ("OUT") ports configured to (respectively) receive communications from and send communications to a network element 202 located in a "north" direction with respect to router 204. Additionally or alternatively, router 204 may include similar port sets to interface with network elements located to the south, west, east, or other direction. In the embodiment depicted, router 204 is configured for X first, Y second routing wherein data moves first in the East/West direction and then in the North/South direction. In other embodiments, any suitable routing scheme may be used.

In various embodiments, router 204 further comprises another port set comprising an input port and an output port configured to receive and send (respectively) communications from and to another agent of the network. In the embodiment depicted, this port set is shown at the center of router 204. In one embodiment, these ports are for communications with logic that is adjacent to, is in communication with, or is otherwise associated with router 204, such as logic of a "local" core 208. Herein, this port set will be referred to as a "core port set," though it may interface with logic other than a core in some implementations. In various embodiments, the core port set may interface with multiple cores (e.g., when multiple cores share a single router) or the router 204 may include multiple core port sets that each interface with a respective core. In another embodiment, this port set is for communications with a network element which is in a next level of a network hierarchy higher than that of router 204. In one embodiment, the east and west directional links are on one metal layer, the north and south directional links on a second metal layer, and the core links on a third metal layer. In an embodiment, router 204 includes crossbar switching and arbitration logic to provide the paths of inter-port communication such as that shown in FIG. 2. Logic (such as core 208) in each network element may have a unique clock and/or voltage or may share a clock and/or voltage with one or more other components of the NoC.

In particular embodiments, a core 208 of a network element may comprise a neuromorphic core including one or more neural units. A processor may include one or more neuromorphic cores. In various embodiments, each neuromorphic core may comprise one or more computational logic blocks that are time-multiplexed across the neural units of the neuromorphic core. A computational logic block may be operable to perform various calculations for a neural unit, such as updating the membrane potential of the neural unit, determining whether the membrane potential exceeds a threshold, and/or other operations associated with a neural unit. Herein, reference herein to a neural unit may refer to logic used to implement a neuron of a neural network. Such logic may include storage for one or more parameters associated with the neuron. In some embodiments, the logic used to implement a neuron may overlap with the logic used to implement one or more other neurons (in some embodiments the neuron may share computational logic with other neurons and control signals may determine which neuron is currently using the logic for processing).

Figure 3:
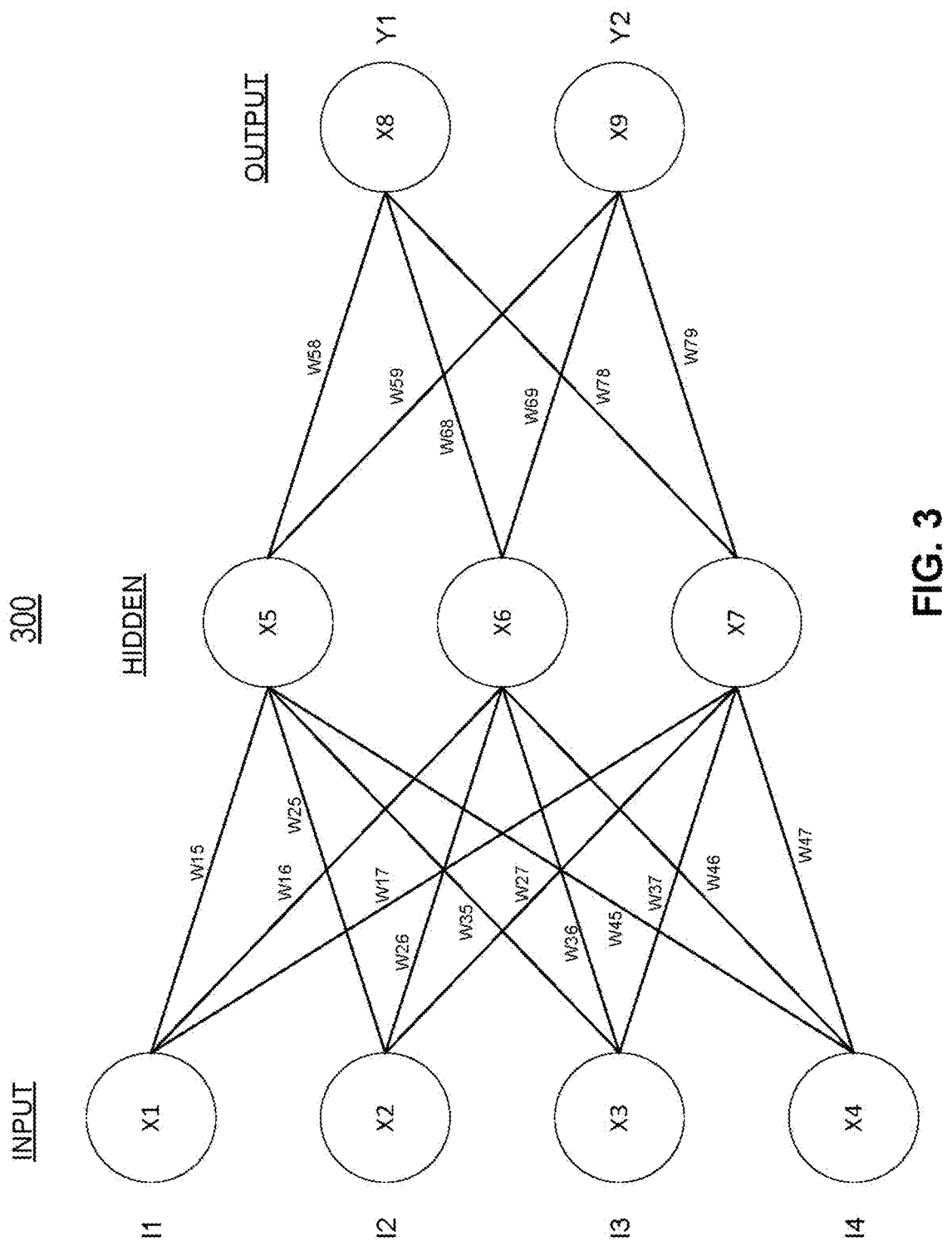
FIG. 3 illustrates an example portion of a neural network in accordance with certain embodiments.

FIG. 3 illustrates an example portion of a neural network 300 in accordance with certain embodiments. The neural network 300 includes neural units X1-X9. Neural units X1-X4 are input neural units that respectively receive primary inputs 11-14 (which may be held constant while the neural network 300 processes an output). Any suitable primary inputs may be used. As one example, when neural network 300 performs image processing, a primary input value may be the value of a pixel from an image (and the value of the primary input may stay constant while the image is processed). As another example, when neural network 300 performs speech processing the primary input value applied to a particular input neural unit may change over time based on changes to the input speech.

While a specific topology and connectivity scheme is shown in FIG. 3, the teachings of the present disclosure may be used in neural networks having any suitable topology and/or connectivity. For example, a neural network may be a feedforward neural network, a recurrent network, or other neural network with any suitable connectivity between neural units. In the embodiment depicted, each link between two neural units has a synaptic weight indicating the strength of the relationship between the two neural units. The synapse weights are depicted as WXY, where X indicates the presynaptic neural unit and Y indicates the post-synaptic neural unit. Links between the neural units may be excitatory or inhibitory in their effect on the activation state of connected neural units. For example, a spike that propagates from X1 to X5 may increase or decrease the membrane potential of X5 depending on the value of W15. In various embodiments, the connections may be directed or undirected.

In general, during each time-step, a neural unit may receive any suitable inputs, such as a bias value or one or more input spikes from one or more other neural units. The bias value applied to a neural unit may be a function of a primary input applied to an input neural unit and/or some other value applied to a neural unit (e.g., a constant value that may be adjusted during training or other operation of the neural network). In various embodiments, each neural unit may be associated with its own bias value or a bias value could be applied to multiple neural units.

The neural unit may perform a function utilizing the values of its inputs and its current membrane potential. For example, the inputs may be added to the current membrane potential of the neural unit to generate an updated membrane potential. As another example, a non-linear function, such as a sigmoid transfer function, may be applied to the inputs and the current membrane potential. Any other suitable function may be used. The neural unit then updates its membrane potential based on the output of the function. When the membrane potential of a neural unit exceeds a threshold, the neural unit may send spikes to each of its fan-out neural units (i.e., the neural units connected to the output of the spiking neural unit). For example, when X1 spikes, the spikes may be propagated to X5, X6, and X7. As another example, when X5 spikes, the spikes may be propagated to X8 and X9 (and in some embodiments to X2, X3, and X4). In various embodiments, when a neural unit spikes, the spike may be propagated to one or more connected neural units residing on the same neuromorphic core and/or packetized and transferred through one or more routers 204 to a neuromorphic core that includes one or more of the spiking neural unit's fan-out neural units.

In a particular embodiment, one or more memory arrays may comprise memory cells that store the synapse weights, membrane potentials, thresholds, outputs (e.g., the number of times that a neural unit has spiked), bias amounts, or other values used during operation of the neural network 300. The number of bits used for each of these values may vary depending on the implementation. In the examples illustrated below, specific bit lengths may be described with respect to particular values, but in other embodiments any suitable bit lengths may be used.

In a particular embodiment, neural network 300 is a spiking neural network (SNN) including a plurality of neural units that each track their respective membrane potentials over a number of time-steps. A membrane potential is updated for each time-step by adjusting the membrane potential of the previous time-step with a bias term, leakage term (e.g., if the neural units are leaky integrate and fire neural units), and/or contributions for incoming spikes. The transfer function applied to the result may generate a binary output.

Although the degree of sparsity in various SNNs for typical pattern recognition workloads is very high (for example, 5% of the entire neural unit population may spike for a particular input pattern), the amount of energy expended in memory access for updating neural states even in the absence of input spikes is significant. For example, memory access for fetching synaptic weights and updating neural states may be the primary component of the total energy consumption of a neuromorphic core. In neural networks (e.g., SNNs) with sparse activity, many neural unit state updates perform very little useful computation.

In various embodiments of the present disclosure, an event-driven neural network leveraging time-hopping computation is provided. Various embodiments described herein provide systems and methods for reducing the number of memory accesses without comprising the accuracy or performance of a computing workload of a neuromorphic computing platform. In particular embodiments, the neural network computes neural unit state changes only on time-steps where spiking events are being processed (i.e., active time-steps). When a neural unit's membrane potential is updated, the contributions to the membrane potential due to time-steps in which the state of the neural unit was not updated (i.e., idle time-steps) are determined and aggregated with contributions to the membrane potential due to the active time-step. The neural unit may then remain idle (i.e., skip membrane potential updates) until the next active time-step, thus improving performance while reducing memory accesses to minimize energy consumption (due to the skipping of memory accesses for idle time-steps).

The event driven, time hopping neural network may be used to perform any suitable workloads, such as the sparse encoding of input images or other suitable workloads (e.g., workloads in which the frequency of spikes is relatively low). Although various embodiments herein are discussed in the context of SNNs, the concepts of this disclosure may be applied to any suitable neural networks, such as convolutional neural networks or other suitable neural networks.

Figure 4A:
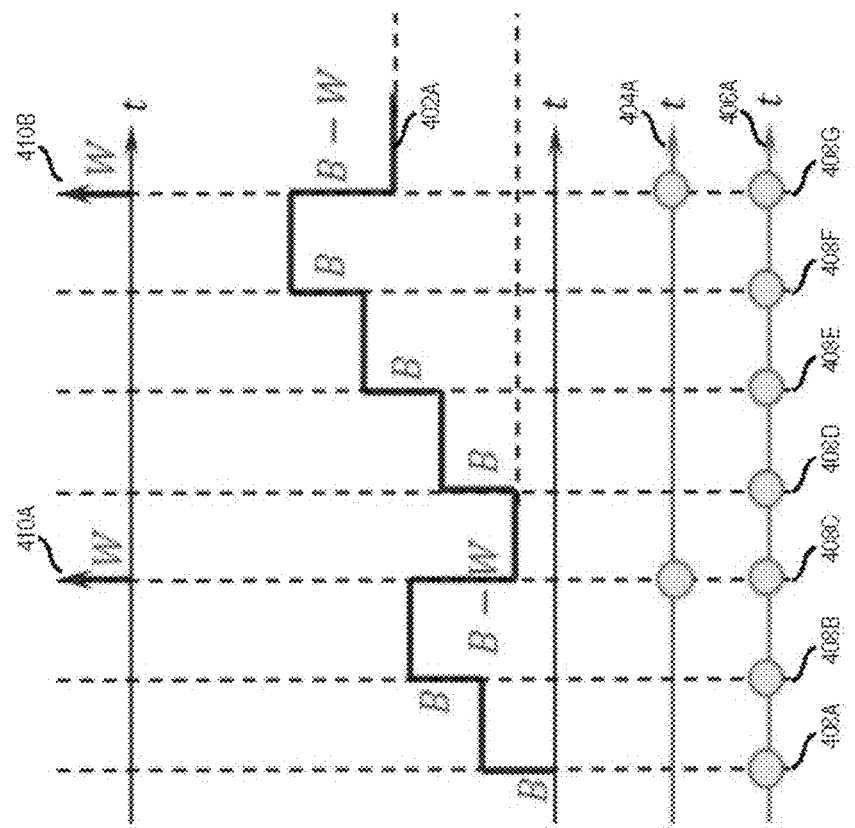
FIG. 4A illustrates an example progression of a membrane potential of a neural unit in accordance with certain embodiments.

FIG. 4A illustrates an example progression of a membrane potential 402A of a neural unit in accordance with certain embodiments. The progression depicted is based on time-step based neural computations in which a neural unit's membrane potential is updated at each time-step 408. FIG. 4A depicts an example membrane potential progression for an integrate and fire neural unit (with no leakage) with an arbitrary input spike pattern. 404A depicts accesses made to an array storing synapse weights for connections between neural units ("synapse array") and 406A depicts accesses made to an array storing bias terms for the neural units ("bias array") and an array storing the current membrane potentials of the neural units ("neural state array"). In various embodiments depicted herein, the membrane potential is simply a sum of the current membrane potential and the inputs to the neural unit, though in other embodiments any suitable function may be used to determine an updated membrane potential.

In various embodiments, the synapse array is stored separately from the bias array and/or the neural state array. In a particular embodiment, the bias and neural state arrays are implemented using a relatively fast memory such as a register file (in which each memory cell is a transistor, a latch, or other suitable structure) while the synapse array is stored using a relatively slower memory (e.g., a static random-access memory (SRAM)) better suited for storing large amounts of information (due to the relatively large number of connections). However, in various embodiments any suitable memory technologies (e.g., register files, SRAM, dynamic random-access memory (DRAM), flash memory, phase change memory, or other suitable memory) may be used for any of these arrays.

At time-step 408A, the bias array and neural state array are accessed and the membrane potential of the neural unit is increased by a bias term (B) for the neural unit and the updated membrane potential is written back to the neural state array. During the time-step 408A, the other neural units may also be updated (in various embodiments the neural units may share processing logic among multiple neural units so the neural units are updated in succession). At time-step 408B, the bias array and neural state array are again accessed and the membrane potential is increased by B. At time-step 408C, an input spike 410A is received. Accordingly, the synapse array is accessed to retrieve the weight of the connection between the neural unit being processed and the neural unit from which the spike was received (or multiple synapse weights if multiple spikes are received). In this example, the spike has a negative effect on the membrane potential (though a spike could alternatively have a positive effect on the membrane potential or no effect on the membrane potential) and the total effect on the potential at time-step 408C is B−W. At time-steps 408D-408F, no input spikes are received, so only the bias array and neural state array are accessed and the bias term is added to the membrane potential at each time-step. At time-step 408G, another input spike 410B is received and thus the synapse array, bias array, and neural state array are accessed to obtain values to update the membrane potential.

In this approach wherein the neural state is updated at each time-step, the membrane potential may be expressed as:

$$u(t+1) = u(t) + B - \sum_i W_i \cdot I_i$$

where u(t+1) equals the membrane potential at the next time-step, u(t) equals the current membrane potential, B is the bias term for the neural unit, and $W_i \cdot I_i$ is the product of a binary indication (i.e., 1 or 0) of whether a particular neural unit i coupled to the neural unit being processed is spiking and the synapse weight of the connection between neural unit i and the neural unit being processed. The summation may be performed over all neural units coupled to the neural unit being processed.

In this example where the neural units are updated at each time-step, the bias array and the neural state array are accessed at each time-step. Such an approach may use excessive energy when input spikes are relatively rare (e.g., for workloads such as sparse encoding of images).

Figure 4B:
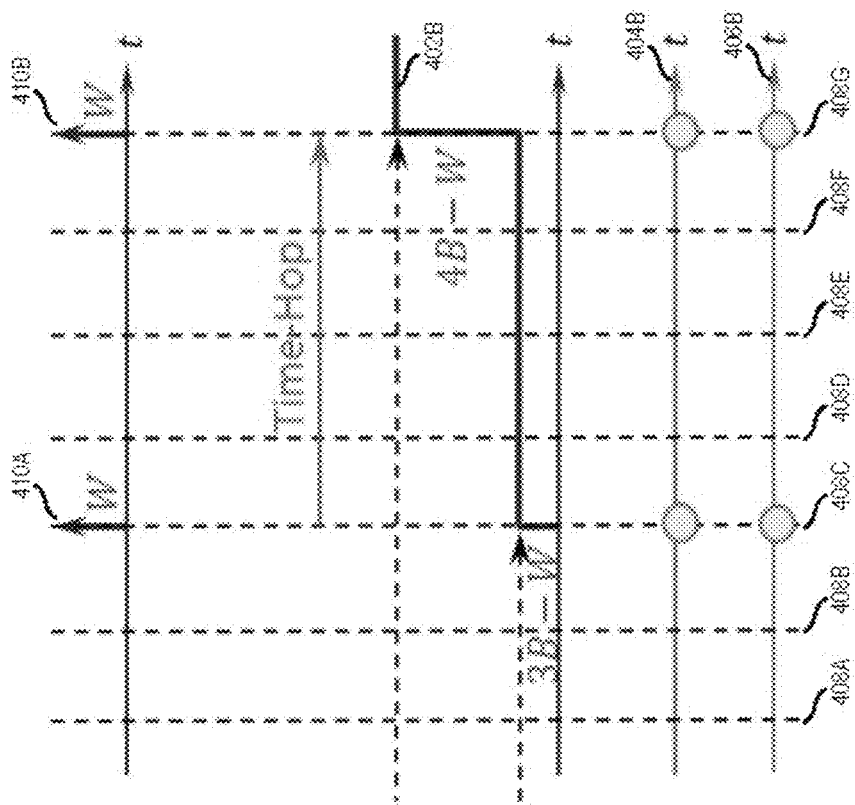
FIG. 4B illustrates an example progression of a membrane potential of a neural unit of an event driven and time hopping neural network in accordance with certain embodiments.

FIG. 4B illustrates an example progression of a membrane potential 402B of a neural unit of an event driven and time hopping neural network in accordance with certain embodiments. The progression depicted is an event driven and time hopping based neural computation in which a neural unit's membrane potential is updated only at active time-steps 408C and 408G in which one or more input spikes are received. As in FIG. 4A, this progression depicts an integrate and fire neural unit (with no leakage) with the same spike pattern and bias input as progression 402A. 404B depicts accesses made to a synapse array and 406B depicts accesses made to a bias array and a neural state array.

In contrast to the approach shown in FIG. 4A, the neural unit skips time-steps 408A and 408B and the bias array and neural state array are not accessed. At time-step 408C, input spike 410A is received. Similar to the progression of FIG. 4A, the synapse array is accessed to retrieve the weight of the connection between the neural unit being processed and the neural unit from which the spike was received (or multiple synapse weights if multiple spikes are received). The neural state array and bias array are also accessed. In addition to identification of synapse weights corresponding to any spikes received, the inputs to the neural unit for the current time-step and any idle time steps not yet accounted for (e.g., time steps occurring in between active time steps) are determined (e.g., via the bias array access or other means). Accordingly, the update to the membrane potential at 408C is calculated as 3*B−W, which includes three bias terms (one for the current time-step and two for the idle time-steps 408A and 408B which were skipped) and the weight of the incoming spike. The neural unit then skips time-steps 408D, 408E, and 408F. At the next active time-step 408G, the membrane potential is again updated based on inputs at each idle time-step and the current time-step, resulting in a change of 4*B−W to the membrane potential.

After each active time-step of FIG. 4B, the membrane potential 402B matches the membrane potential 402A of the same time-step of FIG. 4A. In this example, where the neural units are updated in response to incoming spikes instead of at each time-step, the bias array and the neural state array are only accessed at active time-steps, thus conserving energy and improving processing time while maintaining accurate tracking of the membrane potentials.

In this approach wherein the neural state is not updated at each time-step and the bias term remains constant from the last time-step processed to the time-step being processed, the membrane potential may be expressed as:

$$u(t+n) = u(t) + B \cdot n - \sum_i W_i \cdot I_i$$

where u(t+n) equals the membrane potential at the time-step being processed, u(t) equals the membrane potential at the last time-step processed, n is the number of time-steps from the last processed time-step to the time-step being processed, B is the bias term for the neural unit, and $W_i \cdot I_i$ is the product of a binary indication (i.e., 1 or 0) of whether a particular neural unit i coupled to the neural unit being processed is spiking and the synapse weight of the connection between neural unit i and the neural unit being processed. The summation may be performed over all neural units coupled to the neural unit being processed. If the bias is not constant from the last time-step processed to the time-step being processed, the equation may be modified to:

$$u(t+n) = u(t) + \sum_{j=t+1}^{t+n} B_j - \sum_i W_i \cdot I_i$$

where $B_j$ is the bias term for the neural unit at time-step j.

In various embodiments, after the membrane potential for a neural unit is updated, a determination may be made as to how many time-steps in the future the neural unit is to spike in the absence of any input spikes (i.e., the calculation is made assuming that no input spikes are received by the neural unit prior to the neural unit spiking). With a constant bias B, the number of time-steps until the membrane potential crosses a threshold θ may be determined as follows:

$$t_{next} = (\theta - u)/B$$

where $t_{next}$ equals the number of time-steps until the membrane potential crosses the threshold, u equals the membrane potential that was calculated for the current time-step, and B equals the bias term. Though the methodology is not shown here, the number of time-steps until the membrane potential crosses a threshold θ in the absence of input spikes could also be determined in situations where a bias does not remain constant by determining how many time-steps will elapse before the sum of the biases at each time-step plus the current membrane potential will exceed the threshold.

Figure 5B:
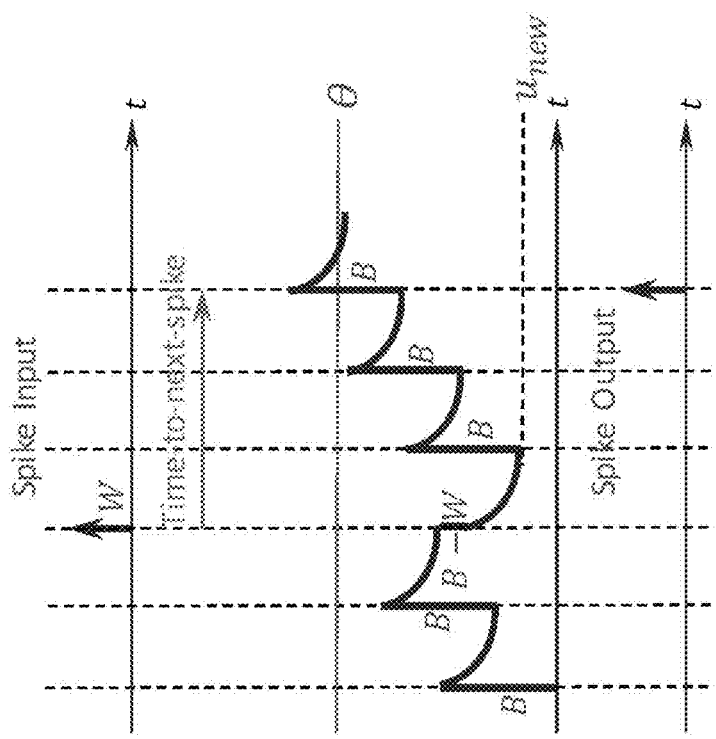
FIG. 5B illustrates an example progression of a membrane potential of a leaky-integrate and fire neural unit in accordance with certain embodiments.
Figure 5A:
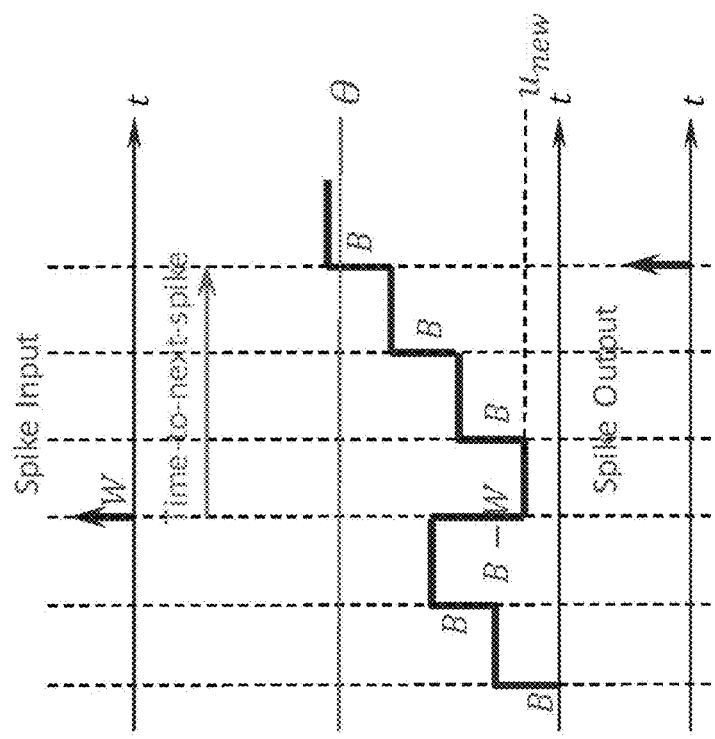
FIG. 5A illustrates an example progression of a membrane potential of an integrate and fire neural unit in accordance with certain embodiments.

FIG. 5A illustrates an example progression of a membrane potential of an integrate and fire neural unit in accordance with certain embodiments. This progression depicts an time-step based approach similar to that shown in FIG. 4A in which a neural unit's membrane potential is updated at each time-step. FIG. 5A also depicts a threshold θ. Once the membrane potential crosses the threshold, the neural unit may generate a spike and then enter a refractory period configured to prevent the neural unit from immediately spiking again (in some embodiments, the potential may be reset to a particular value when the neural unit spikes). As stated above, the membrane potential in the time-step approach may be calculated as follows:

$$u(t+1) = u(t) + B - \sum_i W_i$$

FIG. 5B illustrates an example progression of a membrane potential of a leaky-integrate and fire neural unit in accordance with certain embodiments. In the embodiment depicted, the membrane potential leaks between time-steps and the inputs are scaled based on a time constant T. The membrane potential may be calculated according to the following equation:

$$u(t+1) = (1-\tau) \cdot u(t) + \tau \cdot \left(B - \sum_i W_i\right)$$

Similar to the embodiments described above, after the membrane potential for a leaky integrate and fire neural unit is updated, a determination may be made as to how many time-steps in the future the neural unit is to spike in the absence of any input spikes. With a constant bias B, the number of time-steps until the membrane potential crosses a threshold θ may be calculated based on the above equation. In the absence of input spikes, the equation above becomes:

$$\Rightarrow u(t+1) = (1-\tau) \cdot u(t) + \tau \cdot B$$

Similarly:

$$\Rightarrow u(t+2) = (1-\tau) \cdot u(t+1) + \tau \cdot B = (1-\tau)^2 \cdot u(t) + \tau \cdot B \cdot [1 + (1-\tau)]$$

Accordingly:

$$\Rightarrow u(t+n) = (1-\tau)^n \cdot u(t) + \tau \cdot B \cdot [1 + (1-\tau) + \ldots (1-\tau)^{n-1}] =$$
$$(1-\tau)^n \cdot u(t) + B \cdot [1 - (1-\tau)^n] = (1-\tau)^n \cdot (u(t) - B) + B$$

In order to solve for $t_{next}$ (the number of time-steps until the neural unit crosses the threshold θ in the absence of input spikes), u(t+n) is set to θ, and n (shown here as $t_{next}$) is isolated on one side of the equation:

$$t_{next} = \frac{1}{\log(1-\tau)} \cdot \log\left(\frac{\theta - B}{u_{new} - B}\right)$$

Where $u_{new}$ is the most recently calculated membrane potential for the neural unit. Thus, $t_{next}$ may be determined using logic that implements the above calculation. In some embodiments, the logic may be simplified by using an approximation. In a particular embodiment, the equation for u(t+n):

$$u(t+n) = (1-\tau)^n \cdot (u(t) - B) + B - \tau \cdot \sum_i W_i$$

may be approximated as:

$$\Rightarrow u(t+n) \approx (1 - n\tau) \cdot (u(t) - B) + B - \tau \cdot \sum_i W_i$$

After removing the contribution from the incoming spikes and setting u(t+n) equal to 0, $t_{next}$ may be calculated as:

$$t_{next} = \frac{1}{\tau} \cdot \left(\frac{u_{new} - \theta}{u_{new} - B}\right)$$

Accordingly, $t_{next}$ may be solved for via logic that implements this approximation. Though the methodology is not shown here, the number of time-steps until the membrane potential crosses a threshold θ in the absence of input spikes could also be determined in situations where a bias does not remain constant by determining how many time-steps will elapse before the sum of the biases at each time-step plus the current membrane potential will exceed the threshold (and factoring in the leakage at each time-step).

Figure 6:
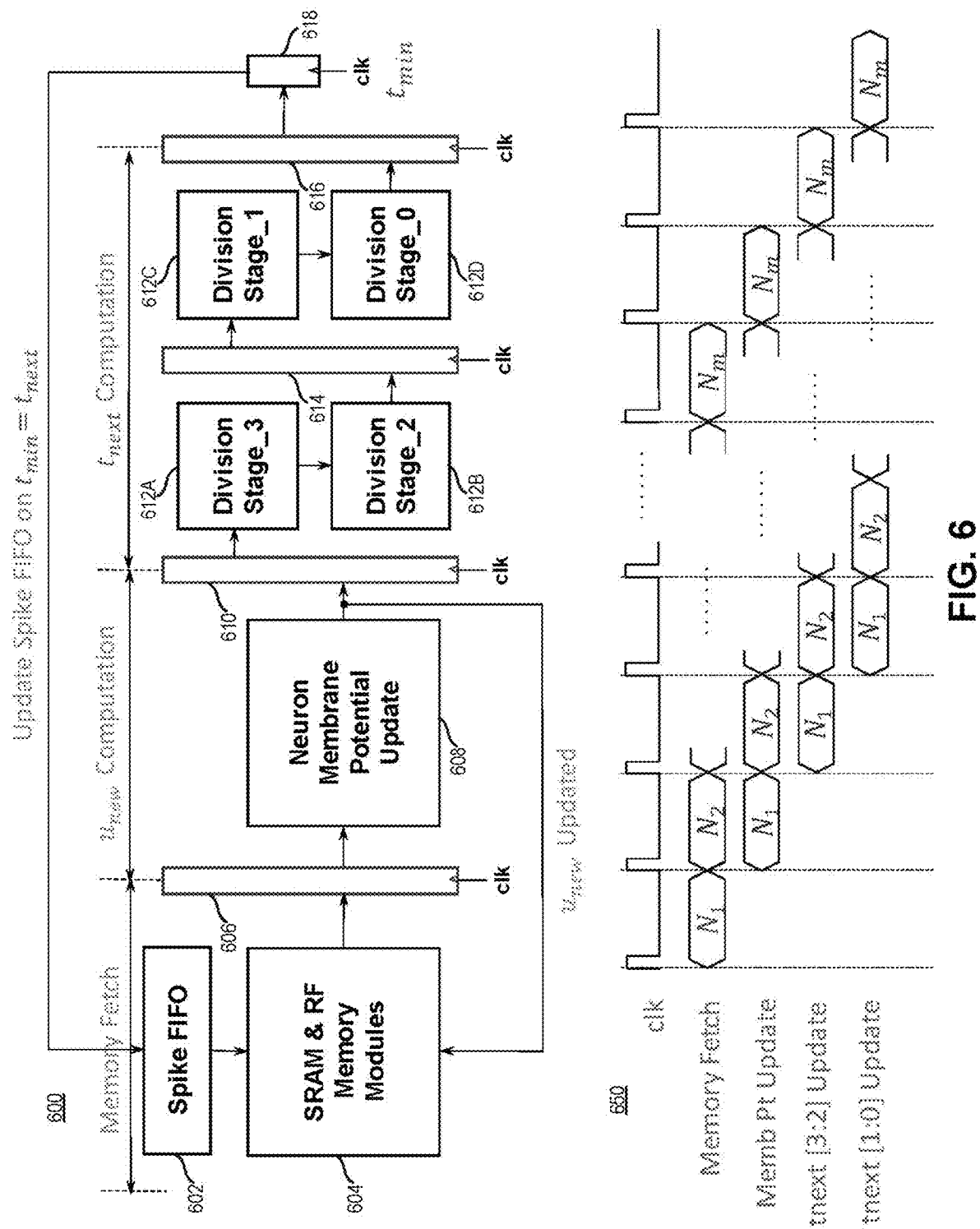
FIG. 6 illustrates an example pipeline of an event driven and time hopping neural network in accordance with certain embodiments.

FIG. 6 illustrates an example pipeline 600 of an event driven and time hopping neural network in accordance with certain embodiments. FIG. 6 also illustrates an example timing diagram 650 for the pipeline 600. Pipeline 600 is merely one of many different ways an event driven and time hopping neural network could be implemented.

In the embodiment depicted, pipeline 600 depicts a spike FIFO 602; SRAM and RF memory modules 604; register banks 606, 610, 614, and 616; neural unit membrane potential update block 608, division logic blocks 612A-612D, and $t_{min}$ update logic block 618.

Spike FIFO 602 stores identifications of the one or more neural units that will spike at the next active time-step. Any suitable identification of a neural unit may be stored in spike FIFO 602, such as a memory address associated with the neural unit (e.g., a memory address of the location of the neural unit's membrane potential, a memory address associated with the location of each synapse weight associated with the neural unit, and/or other memory address associated with the neural unit).

SRAM and RF memory modules 604 store the current states of the neural units and synapses of the neural network. The values stored by memory modules 604 may include membrane potentials (u), synapse weights (W), bias terms (B), spiking thresholds (θ), output values (Y) (e.g., the number of times the neural units have spiked over a particular time period), and/or other suitable parameters associated with the neural network. Although these values are depicted as being stored in particular types of memories (e.g., SRAM and RFs), in other embodiments, these values may be stored in any suitable types of memories. In various embodiments, identifications (of neural units) stored in the spike FIFO 602 may be used to access values associated with the identified neural units stored in memory modules 604.

During the memory fetch stage, values associated with a particular neural unit may be accessed from memory modules 604 and provided to register bank 606 (or other memory module) where they are stored upon an edge of a clock. These values may include the membrane potential of the neural unit, synapse weights of one or more connections between the neural unit and any neural units that are identified as spiking by the spike FIFO 602 (alternatively if multiple connected neural units are spiking the weights could be accessed over multiple clock cycles), one or more bias terms for the neural unit, the spiking threshold of the neural unit, the output value of the neural unit, the leakage time constant of the neural unit, and/or other suitable values associated with the neural unit.

During the membrane potential update stage (i.e., the $u_{new}$ computation stage), values stored in register bank 606 may be provided to the neuron membrane potential update block 608. Block 608 updates the membrane potential of the neural unit, compares the updated potential against the threshold of the neural unit, and generates a spike if the potential exceeds the threshold. In various embodiments, a spike operation may involve incrementing the output value (Y) associated with the neural unit and resetting the membrane potential.

In various embodiments, the membrane potential is updated by accounting for inputs to the neural unit over the current time-step as well as idle time-steps that have occurred since the membrane potential was last calculated. This may involve accessing, by block 608, the last calculated membrane potential, one or more bias terms, the number of time-steps that have occurred since the membrane potential was last calculated, a leakage time constant of the neural unit, and/or the synapse weights of any connected neural units that are spiking during the current time-step. In various embodiments, when all neural units are updated during each active time-step, the number of time-steps since the last update may be stored by a global variable ($t_{min}$). However, if only a portion of the neural units (e.g., only the neural units that are spiking or receiving spikes) are updated during a particular time-step, then the number of time-steps occurring since the last membrane potential update may be tracked on a per-neural unit basis.

Values to be used to calculate the next time the neural unit is going to spike in the absence of input spikes may be passed by the membrane potential update stage to register bank 610. For example, in the simple case of an integrate and fire neural unit with a constant bias term, the value of the threshold minus the new membrane potential is passed to register bank 610 as well as the bias term to enable $t_{next}$ to be calculated during the $t_{next}$ computation stage. During the $t_{next}$ computation stage, one or more division modules 612 may be used to determine the number of time-steps that are to occur before the neural unit spikes again (in the absence of any input spikes). In some embodiments, more sophisticated logic may be used in the $t_{next}$ computation stage to account for non-constant bias terms and/or leaky neural units in order to calculate the number of time-steps until the neural unit is to spike (i.e., $t_{next}$).

After $t_{next}$ is computed for the neural unit, it is stored in register bank 616 and compared against the minimum value (i.e., $t_{min}$) of $t_{next}$ values computed for other neural units during the current time-step by $t_{min}$ update logic block 618. If $t_{next}$ of the neural unit is equal to $t_{min}$, then an identification of the neural unit is added to the spike FIFO 602, thus indicating that the particular neural unit will be spiking during the next processed time-step. If $t_{next}$ of the neural unit is less than $t_{min}$, then $t_{min}$ is updated to $t_{next}$ of the neural unit, the existing values in the spike FIFO 602 are invalidated (e.g., erased or otherwise ignored), and an identification of the neural unit is added to the spike FIFO 602. $t_{min}$ update logic block 618 may include a register file or other memory module that stores $t_{min}$. In a particular embodiment, the updating of membrane potentials of all neural units to be updated during a particular active time-step is completed prior to computing the $t_{next}$ values for the neural units.

In various embodiments, the value of $t_{next}$ calculated during the $t_{next}$ computation stage may be truncated in order to simplify the logic of the $t_{next}$ computation stage. For example, in the embodiment depicted, the lower four bits of $t_{next}$ may be calculated (one bit by each division module 612). In such an embodiment, if the actual value of $t_{next}$ is greater than the truncated value, then the computed value of $t_{next}$ is the maximum truncated value ("15" in the case of four bits), which results in a time-step that would otherwise be skipped being converted to an active time-step. Assuming this is a rare event, the impact on performance and power consumption will be negligible. In various embodiments, it may be likely that the actual value of $t_{next}$ for at least one other neural unit is lower than the maximum truncated value and will be used as $t_{min}$ (and thus the truncation of $t_{next}$ for the particular neural unit becomes irrelevant).

In the embodiment, the various stages are pipelined such that one stage may be performed on a first neural unit during the same clock cycle that another stage is performed on another neural unit and so on. For example, the timing diagram 650 shows that during the first clock cycle, the memory fetch stage is performed for neural unit 1; during the second clock cycle the memory fetch stage is performed for neural unit 2 and the membrane potential update stage is performed for neural unit 1; during the third cycle the memory fetch stage is performed for neural unit 3, the membrane potential update stage is performed for neural unit 2, the first stage of the $t_{next}$ computation stage (where bits 2 and 3 of $t_{next}$ are computed) is performed for neural unit 1; during the fourth cycle the memory fetch stage is performed for neural unit 4, the membrane potential update stage is performed for neural unit 3, the first stage of the $t_{next}$ computation stage is performed for neural unit 2, the second stage of the $t_{next}$ computation stage (wherein bits 0 and 1 of $t_{next}$ are computed) is performed for neural unit 1; and so on. In various embodiments, during a particular time-step, the memory fetch and membrane potential stages are performed many times for each neural unit but the $t_{next}$ update stages are performed only once for each neural unit (e.g., after all of the spikes in the spike FIFO have been processed).

In a particular embodiment, during active time-steps, all of the neural units (regardless of whether they have incoming spikes or not) of the neural network have their membrane potentials updated. In another embodiment, during a particular active time-step, only the neural units that are spiking and the neural units that are receiving spikes have their membrane potentials updated. In such an embodiment, $t_{min}$ and the spike FIFO 602 may be updated based on the minimum $t_{next}$ of the neural units that were updated and the neural units that were not updated (in which case the $t_{next}$ values of the neural units that were not updated would be tracked as the time-step advances).

Once the computations are complete for all neural units that are updated during an active time-step, the neural network skips to the next active time-step (as indicated by the $t_{min}$ value) and performs similar operations to update the neural units.

Figure 7:
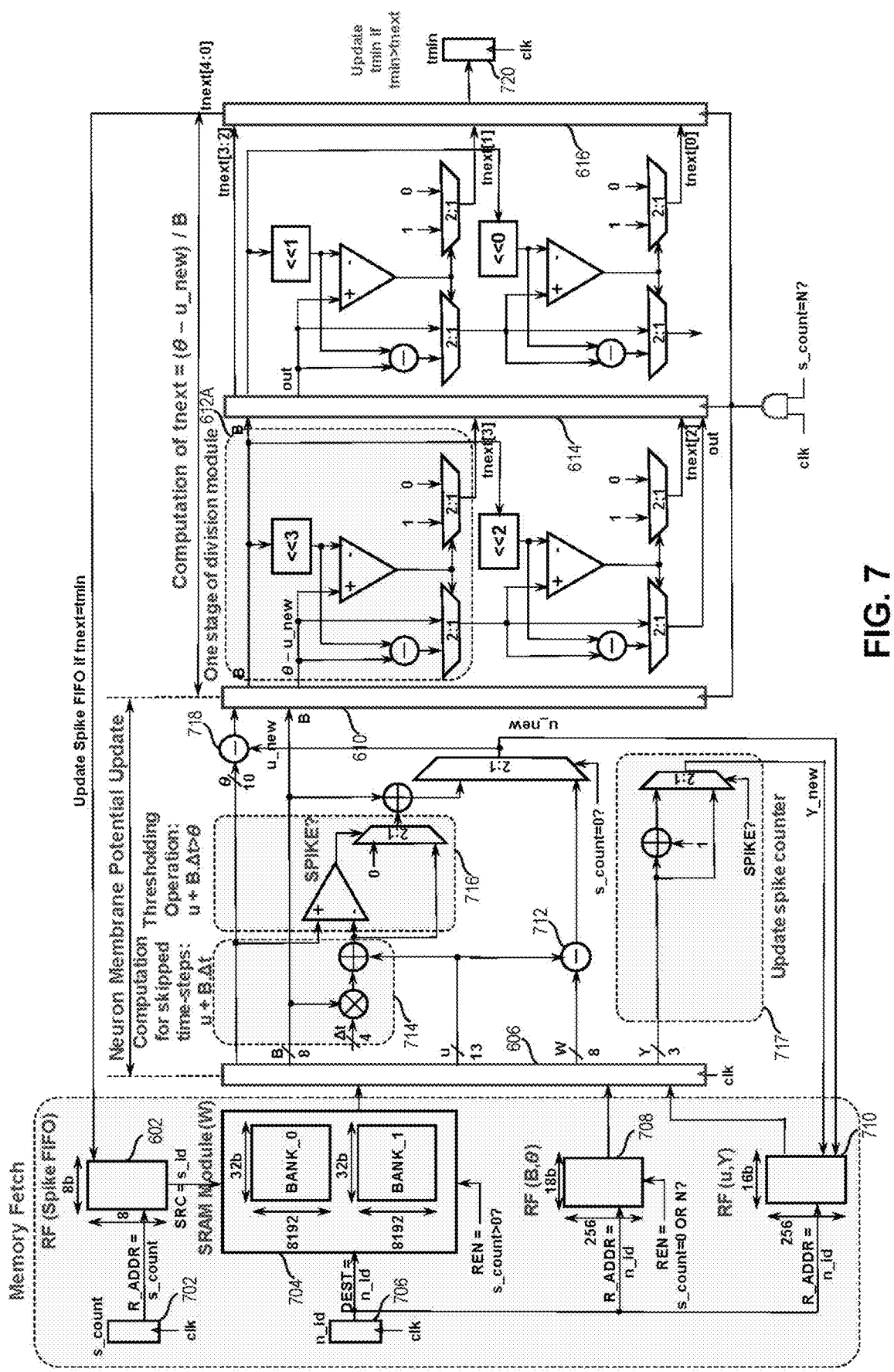
FIG. 7 illustrates example logic blocks of an event driven and time hopping neural network in accordance with certain embodiments.

FIG. 7 illustrates example logic blocks of an event driven and time hopping neural network in accordance with certain embodiments. FIG. 7 illustrates a more detailed version of the pipeline depicted in FIG. 6. The particular embodiment depicted represents an event-driven SNN neuromorphic core comprising 256 neural units to perform. This embodiment is shown by way of example only as the various teachings of the present disclosure may be adapted to any suitable neural network performing any suitable workloads. Thus, any particular elements or element dimensions depicted should not be construed as limiting the teachings of the present disclosure.

Spike count logic 702 tracks and outputs a spike count variable (s_count) that is used to index into spike FIFO 602. The value of s_count may be initially set to 0 during which bias values for the idle time steps are added to the membrane potential and a spike determination is made. The value of s_count is then incremented. The incremented value of s_count indexes to an address (s_id) of a spiking neural unit in the spike FIFO. If multiple neural units spike at an active time-step, spike count logic 702 may be incremented multiple times such that each spike is processed during the active time-step. Thus, spike FIFO 602 may output the identification (e.g., address) of each spiking neural unit for a portion of the processing of the active time-step.

As described earlier, the spike FIFO may store the addresses of the neural units that are spiking during a particular time-step (e.g., because the $t_{next}$ calculated for each of these neural units at the last active time-step was equal to $t_{min}$). When the spike FIFO is indexed with s_count, it outputs an address of one of the spiking neural units. This address may be used to index into a synapse array 704 that stores the synapse weights. Although the synapse array is depicted as an SRAM module with two separate banks of memory, the synapse weight array may be implemented using any suitable memory structures.

Neural unit identification logic 706 tracks and outputs a neural unit identification variable (n_id) comprising a neural unit address that is used to index into the synapse array 704. The neural unit identification logic 706 may cycle through the addresses of neural units being updated during a particular time-step. In time-steps in which all neural units are updated (e.g., in a fully recurrent network), the neural unit identification logic 706 may cycle through the addresses of all the neural units.

The synapse weight array 704 may be indexed by a combination of s_id (i.e., the address of the pre-synapse neural unit) and n_id (i.e., the address of the post-synapse neural unit) and may output the corresponding synapse weight. In a particular embodiment an enable signal may be provided to the synapse weight array 704. In the embodiment depicted, the enable signal is inactive when s_count is zero and active if s_count is greater than zero.

In various embodiments, the neural unit parameters may be stored together with or separately from the synapse weights. For example, in the embodiment depicted, the neural unit parameters are stored separately from the synapse weights in register files 708 and 710. In the embodiment depicted, the neural unit parameters B and 0 are stored in register file 708 and the neural unit parameters u and Y are stored in register file 710 (though in other embodiments, the parameters may be stored together in the same memory module or could be stored in some other arrangement). Thus, register file 708 may store the bias array referenced above (including biases for a plurality of neurons) and register file 710 may store the neural state array (including membrane potentials for a plurality of neurons). The particular grouping of the neural unit parameters may lead to energy efficiencies based on the access patterns of the neural unit parameters. For example, in the embodiment depicted, the membrane potential u may be accessed at various times in which the bias B and the threshold θ do not need to be accessed and thus register file 708 may be turned off during such stages. Values output by the synapse array 704, register file 708, and register file 710 may be buffered by register bank 606.

When s_count equals 0, inputs from the time-steps that were skipped (depicted as Δt) are fetched and added to the membrane potential by logic 714, and the updated membrane potential is then compared against the threshold by logic 716. If the threshold is exceeded, the membrane potential is reset to 0 and spike counter update logic 717 increments the output value Y. The bias for the current time-step is added to the output of logic 716 and the updated membrane potential is written to the register file 710.

The logic then processes the first spike of spike FIFO 602. s_count is incremented and the synapse weight output by synapse weight array 704 (i.e., the synapse weight for the connection between the pre-synapse neural unit identified by the current value of s_id and the neural unit identified by n_id) is subtracted (though a synapse weight could alternatively have a positive effect on the membrane potential) by logic 712 and the updated membrane potential is written to register file 710. The next neuron is processed by updating n_id to another value that points to a different neuron to receive the spike, accessing the appropriate synapse weight, and updating the membrane potential. This process is repeated for each neural unit receiving the spike. If the spike FIFO 602 contains additional spiking neural units, this procedure is repeated for each of the entries in the spike FIFO 602.

When the last spike is reached (i.e., s_count equals N), in addition to performing the first two stages, the computation of $t_{next}$ is also performed. The updated membrane potential is subtracted from theta by logic 718 and stored in register bank 610 along with the bias value B. This value (ϑ−u) is then divided by the bias B by division modules 612. The lowest four bits of the division operation is stored in register bank 616. $t_{min}$ is updated by logic 618 (or 720) if the result of the division is less than the current value of $t_{min}$ and the spike FIFO 602 is updated with an identification of the neural unit being processed (i.e., n_id) if the result of the division is less than or equal to the current value of $t_{min}$. Once each neuron has been processed in like manner, the logic may jump to the next active timestep as identified by $t_{min}$.

Figure 8:
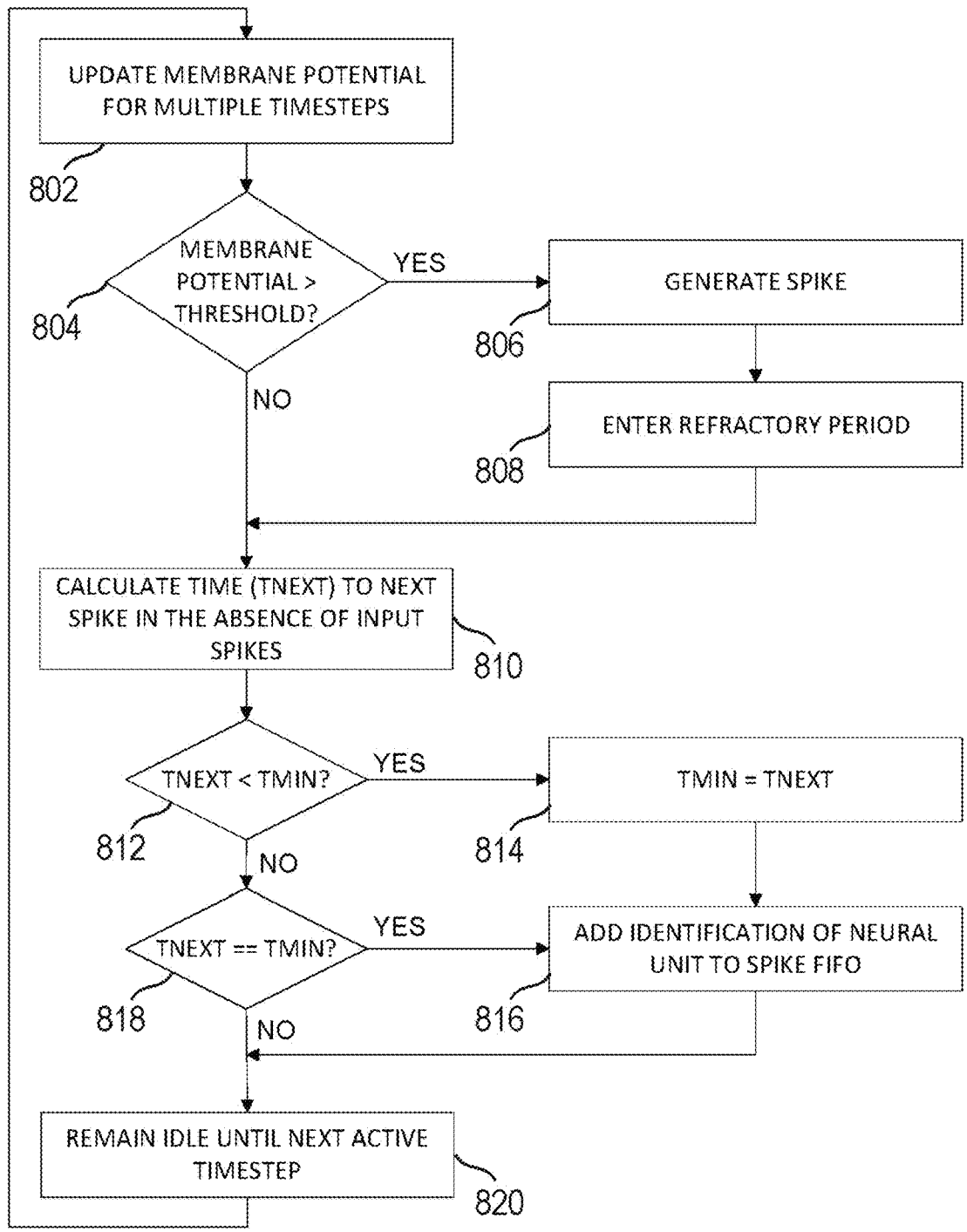
FIG. 8 illustrates an example flow for performing event driven and time hopping updates to neural units of a neural network in accordance with certain embodiments.

FIG. 8 illustrates an example flow 800 for performing event driven and time hopping updates to neural units of a neural network in accordance with certain embodiments. The various blocks may be performed for each neural unit that is updated during an active time-step.

At 802, the membrane potential of a neural unit is updated for multiple time-steps. For example, the membrane potential may be updated for each time-step that has elapsed since the membrane potential was last updated. The membrane potential may be updated as a function of the last calculated membrane potential of the neural unit, one or more input bias values, one or more leakage time constants, and/or other suitable inputs. At 804, a determination is made as to whether the updated membrane potential exceeds a threshold of the neural unit. If the threshold is exceeded, the neural unit generates a spike at 806. This may result in the incrementation of the spike counter. After spiking, a neural unit enters a refractory period at 808. In various embodiments, the refractory period may involve reducing the membrane potential (e.g., to zero or other voltage) and/or preventing the neural unit from spiking again for a particular period of time. In a particular embodiment, input spikes from other neurons may adjust the membrane potential after the spiking determination is made.

If the membrane potential was not greater than the threshold at 804 or after entering the refractory period at 808, a number of time-steps ($t_{next}$) until the neural unit is to spike again is calculated under the assumption that no input spikes are received before the membrane potential of the neural unit will cross the threshold at 810. In a particular embodiment, this calculation may be based on a number of time-steps that the neural unit is to remain in a refractory period. The calculated $t_{next}$ value is then compared against the smallest $t_{next}$ (i.e., $t_{min}$) calculated among neural units for which a similar calculation has been performed. At 812, if $t_{next}$ for the neural unit is smaller than $t_{min}$, then $t_{min}$ is updated to $t_{next}$ at 814 and an identification of the neural unit is added to the spike FIFO at 816. Similarly, at 818, if $t_{next}$ is equal to $t_{min}$ rather than smaller than $t_{min}$, then an identification of the neural unit is added to the spike FIFO at 816. If $t_{min}$ is larger than $t_{min}$, then an identification of the neural unit is not added to the spike FIFO (since this means a different neural unit is to spike earlier). At 820, the neural unit remains idle (i.e., the membrane potential is not updated until the next active time-step). After determining the $t_{next}$ times for all neural units in the neural network, the neural network jumps to the next active time-step (as indicated by $t_{min}$) for further processing.

Some of the blocks illustrated in FIG. 8 may be repeated, combined, modified or deleted where appropriate, and additional blocks may also be added to the flowchart. Additionally, blocks may be performed in any suitable order without departing from the scope of particular embodiments.

Figure 9:
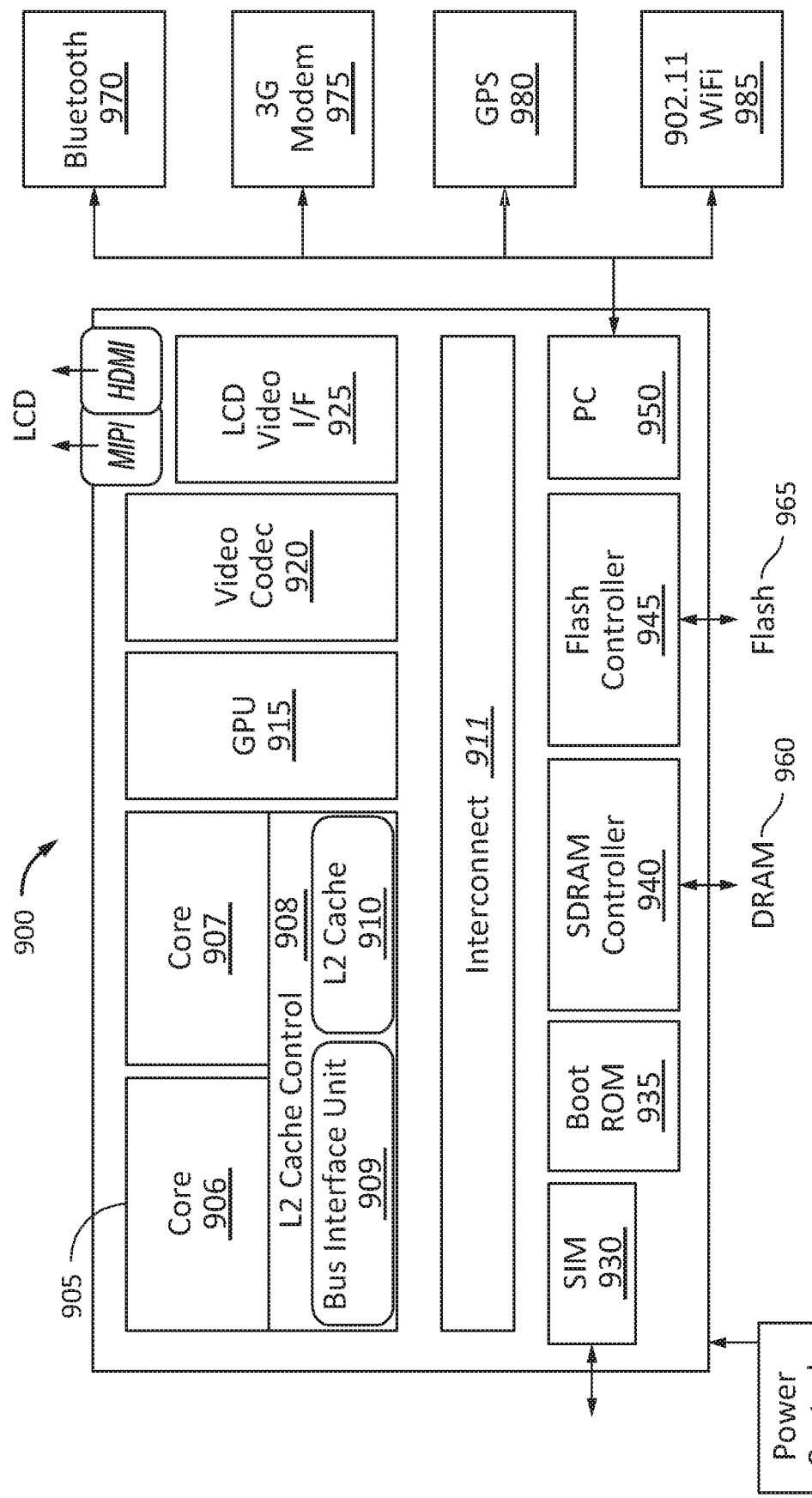
FIG. 9 illustrates a block diagram for an example computing system that may implement a neural network in accordance with certain embodiments.

In FIG. 9, an embodiment of a system on-chip (SOC) design in accordance with the disclosures is depicted. In a particular embodiment, an SOC may include a neural network as described herein. As a specific illustrative example, SOC 900 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 900 includes 2 cores-906 and 907. Similar to the discussion above, cores 906 and 907 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 906 and 907 are coupled to cache control 908 that is associated with bus interface unit 909 and L2 cache 910 to communicate with other parts of system 900. Interconnect 911 includes an on-chip interconnect, such as an IOSF, AMBA, or other interconnect discussed above, which potentially implements one or more aspects of the described disclosure. Any of these components may incorporate aspects of the disclosure described herein.

Interconnect 911 provides communication channels to the other components, such as a Subscriber Identity Module (SIM) 930 to interface with a SIM card, a boot rom 935 to hold boot code for execution by cores 906 and 907 to initialize and boot SOC 900, a SDRAM controller 940 to interface with external memory (e.g. DRAM 960), a flash controller 945 to interface with non-volatile memory (e.g. Flash 965), a peripheral control 950 (e.g. Serial Peripheral Interface) to interface with peripherals, video codecs 920 and Video interface 925 to display and receive input (e.g. touch enabled input), GPU 915 to perform graphics related computations, etc. Any of these interfaces may incorporate aspects of the disclosure described herein.

In addition, the system illustrates power control 955 and peripherals for communication, such as a Bluetooth module 970, 3G modem 975, GPS 980, and WiFi 985. Note as stated above, a UE includes a radio for communication. As a result, these peripheral communication modules are not all required. However, in a UE some form a radio for external communication is to be included.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the manufacture of the described hardware.

In any representation of the design, the data representing the design may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

Thus, one or more aspects of at least one embodiment may be implemented by representative instructions stored on a machine-readable medium which represents various logic within the processor, which when read by a machine causes the machine to fabricate logic to perform the techniques described herein. Such representations, often referred to as "IP cores" may be stored on a non-transitory tangible machine readable medium and supplied to various customers or manufacturing facilities to load into the fabrication machines that manufacture the logic or processor.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In various embodiments, the language may be a compiled or interpreted language.

The embodiments of methods, hardware, software, firmware or code set forth above may be implemented via instructions or code stored on a machine-accessible, machine readable, computer accessible, or computer readable medium which are executable (or otherwise accessible) by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information therefrom.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Logic may be used to implement any of the functionality of the various components (or subcomponents of these components) such as processor 100, router 204, core 208, the neural units, the various arrays, spike FIFO 602, neuron membrane potential update block 608, division blocks 612, or other component described herein. "Logic" may refer to hardware, firmware, software and/or combinations of each to perform one or more functions. As an example, logic may include hardware, such as a micro-controller or processor, associated with a non-transitory medium to store code adapted to be executed by the micro-controller or processor. Therefore, reference to logic, in one embodiment, refers to the hardware, which is specifically configured to recognize and/or execute the code to be held on a non-transitory medium. Furthermore, in another embodiment, use of logic refers to the non-transitory medium including the code, which is specifically adapted to be executed by the microcontroller to perform predetermined operations. And as can be inferred, in yet another embodiment, the term logic (in this example) may refer to the combination of the hardware and the non-transitory medium. In various embodiments, logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. Logic may include one or more gates or other circuit components, which may be implemented by, e.g., transistors. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. Often, logic boundaries that are illustrated as separate commonly vary and potentially overlap. For example, first and second logic may share hardware, software, firmware, or a combination thereof, while potentially retaining some independent hardware, software, or firmware.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

In at least one embodiment, a processor comprises a memory to store a membrane potential of a neural unit of a neural network; and a neuromorphic core to calculate, at a particular time-step of the neural network, a change to the membrane potential of the neural unit occurring over multiple time-steps that have elapsed since the last time-step at which the membrane potential was updated, wherein each of the multiple time-steps that have elapsed since the last time-step is associated with at least one input to the neural unit that affects the membrane potential of the neural unit.

In an embodiment, calculating, at the particular time-step, the change to the membrane potential of the neural unit over the multiple time-steps includes accounting for one or more bias inputs applied to the neural unit over the multiple time-steps. In an embodiment, calculating, at the particular time-step, the change to the membrane potential of the neural unit over the multiple time-steps includes multiplying a bias term by the number of time-steps that have elapsed since the last time-step at which the membrane potential was updated. In an embodiment, calculating, at the particular time-step, the change to the membrane potential of the neural unit over the multiple time-steps includes accounting for at least one synapse weight of at least one input spike from at least one other neural unit of the neural network. In an embodiment, calculating, at the particular time-step, the change to the membrane potential of the neural unit over the multiple time-steps includes accounting for an amount of leakage from the neural unit over the multiple time-steps. In an embodiment, the neuromorphic core is further to calculate, at the particular time-step of the neural network, a future time-step at which the neural unit will cross a membrane potential threshold. In an embodiment, calculating the future time-step comprises subtracting the membrane potential of the neural unit from the membrane potential threshold and dividing the result by a bias value. In an embodiment, the neuromorphic core is further to calculate, at the particular time-step of the neural network, future time-steps for a plurality of neural units, each future time-step indicating when a respective neural unit will cross a respective membrane potential threshold; determine the smallest calculated future time-step; and jump to the smallest calculated future time-step to update membrane potentials of neural units of the neural network. In an embodiment, the memory is further to store an identification of each neural unit for which the calculated future time-step matches the smallest calculated future time-step. In an embodiment, the memory further comprises a first register file to store bias inputs and membrane potential thresholds and a second register file to store membrane potentials.

In at least one embodiment, a method comprises storing a membrane potential of a neural unit of a neural network; and calculating, at a particular time-step of the neural network, a change to the membrane potential of the neural unit occurring over multiple time-steps that have elapsed since the last time-step at which the membrane potential was updated, wherein each of the multiple time-steps that have elapsed since the last time-step is associated with at least one input to the neural unit that affects the membrane potential of the neural unit.

In an embodiment, calculating, at the particular time-step, the change to the membrane potential of the neural unit over the multiple time-steps includes accounting for one or more bias inputs applied to the neural unit over the multiple time-steps. In an embodiment, calculating, at the particular time-step, the change to the membrane potential of the neural unit over the multiple time-steps includes multiplying a bias term by the number of time-steps that have elapsed since the last time-step at which the membrane potential was updated. In an embodiment, calculating, at the particular time-step, the change to the membrane potential of the neural unit over the multiple time-steps includes accounting for at least one synapse weight of at least one input spike from at least one other neural unit of the neural network. In an embodiment, calculating, at the particular time-step, the change to the membrane potential of the neural unit over the multiple time-steps includes accounting for an amount of leakage from the neural unit over the multiple time-steps. In an embodiment, a method further comprises calculating, at the particular time-step of the neural network, a future time-step at which the neural unit will cross a membrane potential threshold. In an embodiment, calculating the future time-step comprises subtracting the membrane potential of the neural unit from the membrane potential threshold and dividing the result by a bias value. In an embodiment, a method further comprises calculating, at the particular time-step of the neural network, future time-steps for a plurality of neural units, each future time-step indicating when a respective neural unit will cross a respective membrane potential threshold; determining the smallest calculated future time-step; and jumping to the smallest calculated future time-step to update membrane potentials of neural units of the neural network. In an embodiment, a method further comprises storing an identification of each neural unit for which the calculated future time-step matches the smallest calculated future time-step. In an embodiment, the method further comprises storing bias inputs and membrane potential thresholds in a first register file and storing membrane potentials in a second register file. In an embodiment, calculating the future time-step comprises accounting for a leakage term. In an embodiment, calculating the future time-step comprises accounting for a bias that changes value from a first time-step to a second time-step.

In at least one embodiment, a non-transitory machine readable storage medium has instructions stored thereon, the instructions when executed by a machine to cause the machine to store a membrane potential of a neural unit of a neural network; and calculate, at a particular time-step of the neural network, a change to the membrane potential of the neural unit occurring over multiple time-steps that have elapsed since the last time-step at which the membrane potential was updated, wherein each of the multiple time-steps that have elapsed since the last time-step is associated with at least one input to the neural unit that affects the membrane potential of the neural unit.

In an embodiment, calculating, at the particular time-step, the change to the membrane potential of the neural unit over the multiple time-steps includes accounting for one or more bias inputs applied to the neural unit over the multiple time-steps. In an embodiment, calculating, at the particular time-step, the change to the membrane potential of the neural unit over the multiple time-steps includes accounting for at least one synapse weight of at least one input spike from at least one other neural unit of the neural network. In an embodiment, the instructions when executed by the machine are to further cause the machine to calculate, at the particular time-step of the neural network, a future time-step at which the neural unit will cross a membrane potential threshold. In an embodiment, the instructions when executed by the machine are to further cause the machine to calculate, at the particular time-step of the neural network, future time-steps for a plurality of neural units, each future time-step indicating when a respective neural unit will cross a respective membrane potential threshold; determine the smallest calculated future time-step; and jump to the smallest calculated future time-step to update membrane potentials of neural units of the neural network.

In at least one embodiment, a system comprises means for storing a membrane potential of a neural unit of a neural network; and means for calculating, at a particular time-step of the neural network, a change to the membrane potential of the neural unit occurring over multiple time-steps that have elapsed since the last time-step at which the membrane potential was updated, wherein each of the multiple time-steps that have elapsed since the last time-step is associated with at least one input to the neural unit that affects the membrane potential of the neural unit.

In an embodiment, calculating, at the particular time-step, the change to the membrane potential of the neural unit over the multiple time-steps includes accounting for one or more bias inputs applied to the neural unit over the multiple time-steps. In an embodiment, calculating, at the particular time-step, the change to the membrane potential of the neural unit over the multiple time-steps includes accounting for at least one synapse weight of at least one input spike from at least one other neural unit of the neural network. In an embodiment, the system further comprises calculating, at the particular time-step of the neural network, a future time-step at which the neural unit will cross a membrane potential threshold. In an embodiment, a system further comprises means for calculating, at the particular time-step of the neural network, future time-steps for a plurality of neural units, each future time-step indicating when a respective neural unit will cross a respective membrane potential threshold; means for determining the smallest calculated future time-step; and means for jumping to the smallest calculated future time-step to update membrane potentials of neural units of the neural network.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor comprising:
   a memory to store a membrane potential of a neural unit of a neural network; and
   a neuromorphic core to calculate, at a particular time-step of the neural network, a change to the membrane potential of the neural unit occurring over multiple time-steps that have elapsed since the last time-step at which the membrane potential was updated, wherein each of the multiple time-steps that have elapsed since the last time-step is associated with at least one input to the neural unit that affects the membrane potential of the neural unit, wherein calculating at the particular time-step the change to the membrane potential of the neural unit over the multiple time-steps includes accounting for one or more bias inputs applied to the neural unit over the multiple time-steps and accounting for a time constant, wherein the time constant is used to scale the one or more bias inputs and is also used to specify an amount of leakage of the membrane potential over one time-step, wherein scaling of the one or more bias inputs is based on a multiplication of the time constant with the one or more bias inputs, and wherein the amount of leakage of the membrane potential over one time-step is based on a multiplication of the membrane potential at a particular timestep with a value of one minus the time constant.

2. The processor of claim 1, wherein calculating, at the particular time-step, the change to the membrane potential of the neural unit over the multiple time-steps includes accounting for one or more bias inputs applied to the neural unit over the multiple time-steps.

3. The processor of claim 1, wherein calculating, at the particular time-step, the change to the membrane potential of the neural unit over the multiple time-steps includes multiplying a bias term by the number of time-steps that have elapsed since the last time-step at which the membrane potential was updated.

4. The processor of claim 1, wherein calculating, at the particular time-step, the change to the membrane potential of the neural unit over the multiple time-steps includes accounting for at least one synapse weight of at least one input spike from at least one other neural unit of the neural network.

5. The processor of claim 1, wherein calculating, at the particular time-step, the change to the membrane potential of the neural unit over the multiple time-steps includes accounting for an amount of leakage in the membrane potential of the neural unit over the multiple time-steps.

6. The processor of claim 1, the neuromorphic core further to:
calculate, at the particular time-step of the neural network, a future time-step at which the neural unit will cross a membrane potential threshold.

7. The processor of claim 6, wherein calculating the future time-step comprises subtracting the membrane potential of the neural unit from the membrane potential threshold and dividing the result by a bias value.

8. The processor of claim 1, the neuromorphic core further to:
calculate, at the particular time-step of the neural network, future time-steps for a plurality of neural units, each future time-step indicating when a respective neural unit will cross a respective membrane potential threshold;
determine the smallest calculated future time-step; and
jump to the smallest calculated future time-step to update membrane potentials of neural units of the neural network.

9. The processor of claim 8, the memory further to:
store an identification of each neural unit for which the calculated future time-step matches the smallest calculated future time-step.

10. The processor of claim 1, the memory comprising a first register file to store bias inputs and membrane potential thresholds and a second register file to store membrane potentials.

11. A non-transitory machine readable storage medium having instructions stored thereon, the instructions when executed by a machine to cause the machine to:
store a membrane potential of a neural unit of a neural network; and
calculate, at a particular time-step of the neural network, a change to the membrane potential of the neural unit occurring over multiple time-steps that have elapsed since the last time-step at which the membrane potential was updated, wherein each of the multiple time-steps that have elapsed since the last time-step is associated with at least one input to the neural unit that affects the membrane potential of the neural unit, wherein calculating at the particular time-step the change to the membrane potential of the neural unit over the multiple time-steps includes accounting for one or more bias inputs applied to the neural unit over the multiple time-steps and accounting for a time constant, wherein the time constant is used to scale the one or more bias inputs and is also used to specify an amount of leakage of the membrane potential over one time-step, wherein scaling of the one or more bias inputs is based on a multiplication of the time constant with the one or more bias inputs, and wherein the amount of leakage of the membrane potential over one time-step is based on a multiplication of the membrane potential at a particular timestep with the value of one minus the time constant.

12. The medium of claim 11, wherein calculating, at the particular time-step, the change to the membrane potential of the neural unit over the multiple time-steps includes accounting for one or more bias inputs applied to the neural unit over the multiple time-steps.

13. The medium of claim 11, wherein calculating, at the particular time-step, the change to the membrane potential of the neural unit over the multiple time-steps includes accounting for at least one synapse weight of at least one input spike from at least one other neural unit of the neural network.

14. The medium of claim 11, the instructions when executed by the machine to further cause the machine to calculate, at the particular time-step of the neural network, a future time-step at which the neural unit will cross a membrane potential threshold.

15. The medium of claim 11, the instructions when executed by the machine to further cause the machine to:
calculate, at the particular time-step of the neural network, future time-steps for a plurality of neural units, each future time-step indicating when a respective neural unit will cross a respective membrane potential threshold;
determine the smallest calculated future time-step; and
jump to the smallest calculated future time-step to update membrane potentials of neural units of the neural network.

16. A method comprising:
storing a membrane potential of a neural unit of a neural network; and
calculating, at a particular time-step of the neural network, a change to the membrane potential of the neural unit occurring over multiple time-steps that have elapsed since the last time-step at which the membrane potential was updated, wherein each of the multiple time-steps that have elapsed since the last time-step is associated with at least one input to the neural unit that affects the membrane potential of the neural unit, wherein calculating at the particular time-step the change to the membrane potential of the neural unit over the multiple time-steps includes accounting for one or more bias inputs applied to the neural unit over the multiple time-steps and accounting for a time constant, wherein the time constant is used to scale the one or more bias inputs and is also used to specify an amount of leakage of the membrane potential over one time-step, wherein scaling of the one or more bias inputs is based on a multiplication of the time constant with the one or more bias inputs, and wherein the amount of leakage of the membrane potential over one time-step is based on a multiplication of the membrane potential at a particular timestep with the value of one minus the time constant.

17. The method of claim 16, wherein calculating, at the particular time-step, the change to the membrane potential of the neural unit over the multiple time-steps includes accounting for one or more bias inputs applied to the neural unit over the multiple time-steps.

18. The method of claim 16, wherein calculating, at the particular time-step, the change to the membrane potential of the neural unit over the multiple time-steps includes accounting for at least one synapse weight of at least one input spike from at least one other neural unit of the neural network.

19. The method of claim 16, further comprising calculating, at the particular time-step of the neural network, a future time-step at which the neural unit will cross a membrane potential threshold.

20. The method of claim 16, further comprising:
  calculating, at the particular time-step of the neural network, future time-steps for a plurality of neural units, each future time-step indicating when a respective neural unit will cross a respective membrane potential threshold;
  determining the smallest calculated future time-step; and
  jumping to the smallest calculated future time-step to update membrane potentials of neural units of the neural network.

* * * * *